United States Patent
Aubert et al.

(10) Patent No.: US 8,661,054 B2
(45) Date of Patent: *Feb. 25, 2014

(54) FILE MANAGEMENT METHOD AND SYSTEM

(71) Applicant: International Business Machines Corporation, Armonk, NY (US)

(72) Inventors: Denis Aubert, Le Gaude (FR); Olivier Oudot, Valbonne (FR); Joaquin Picon, La Gaude (FR); Bernard Pucci, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/743,572

(22) Filed: Jan. 17, 2013

(65) Prior Publication Data

US 2013/0138678 A1 May 30, 2013

Related U.S. Application Data

(63) Continuation of application No. 13/164,888, filed on Jun. 21, 2011, now Pat. No. 8,412,731.

(30) Foreign Application Priority Data

Dec. 9, 2010 (EP) .................................. 10306379

(51) Int. Cl.
*G06F 17/30* (2006.01)
(52) U.S. Cl.
USPC ......................................................... 707/769
(58) Field of Classification Search
USPC ........................ 707/769, 758, 828
See application file for complete search history.

(56) References Cited

U.S. PATENT DOCUMENTS

| 6,351,741 | B1 | 2/2002 | Flenniken |
| 6,449,615 | B1* | 9/2002 | Liu et al. ............................... 1/1 |
| 2008/0250017 | A1* | 10/2008 | Best et al. ......................... 707/6 |
| 2009/0077136 | A1* | 3/2009 | Igawa et al. .................... 707/200 |

FOREIGN PATENT DOCUMENTS

EP 2003576 A1 12/2008

OTHER PUBLICATIONS

Bullock, U.S. Appl. No. 13/164,888, Office Action Communication, FR920100063US1, May 10, 2012, 12 pages.
Bullock, U.S. Appl. No. 13/164,888, Final Office Action Communication, FR920100063US1, Nov. 9, 2012, 9 pages.
Bullock, U.S. Appl. No. 13/164,888, Notice of Allowance and Fees Due, FR920100063US1, Nov. 27, 2012, 9 pages.
Golze, International Application No. PCT/EP2011/068239, International Search Report and Written Opinion, Dec. 15, 2011, 9 pages.

* cited by examiner

*Primary Examiner* — Joshua Bullock
(74) *Attorney, Agent, or Firm* — Douglas A. Lashmit; Hoffman Warnick LLC

(57) ABSTRACT

The invention provides a file management method and system for managing file retrieval and access. The method operates at the operating system level within a file system of a computer device and allows creating file move links upon detection of a file move request. The file move link associates the file source location with the file target location and is stored within a file move link table of the file system for subsequent file access request. File path to target location is automatically retrieved and file reached transparently for the user.

15 Claims, 4 Drawing Sheets

FILE MANAGEMENT METHOD AND SYSTEM

The current application claims the benefit of co-pending U.S. application Ser. No. 13/164,888, titled "File Management Method and System," which was filed on Jun. 21, 2011, and which is hereby incorporated by reference.

TECHNICAL FIELD

The present invention relates to a file management method and system and more particularly to a file move tracking method and system.

RELATED ART

Creating, managing, retrieving, and protecting data is a critical requirement of every business today. The efficient management of data is an ongoing struggle between access and scalability. Providing access to file-level data (e.g., files associated with individual documents, multimedia files, databases and other applications) becomes more difficult as more users are provided access and more data is stored. Achieving the scalability needed to respond to data volume growth also typically results in higher hardware and software costs, and greater management challenges.

At the individual level, people often have several thousand files stored on their computer. Computers generally include a file system to store and organize computer files and data. Essentially, file systems organize the files into a database for the storage, organization, manipulation, and retrieval by the computer's operating system.

File systems are used on data storage devices such as hard disks or CD-ROMs to maintain the physical location of the files. The file system is created when the hard disk is initialized. It sets up the root directory and subsequent directories beneath the root directory. The file system allows the user to create new files and folders, which are added to different parts of a "file tree" on the hard disk. For example, a hard disk has separate folders for programs, documents, pictures, music, and movie files. Within these folders, there are likely other folders that further organize the files. All these folders (or directories) are organized by the computer's file system. There are also several folders used by the computer's operating system to store system files, such as startup data and system preferences. Some of these folders are invisible to the user, but are recognized by the computer's file system. The DOS, Windows, OS/2, Macintosh, and UNIX-based operating systems all have file systems in which files are placed somewhere in a hierarchical structure. A file is placed in a directory (or folder) or subdirectory at the desired place in the tree structure. Windows operating system computers use file systems called FAT32 or NTFS. Macintosh computers used the HFS or HFS+ file system.

Beyond this, the file systems provide access to data on a file server by acting as clients for a network protocol (e.g., NFS, SMB, or 9P clients), or they may be virtual and exist only as an access method for virtual data (e.g., procfs).

File systems specify conventions for naming files. These conventions include the maximum number of characters in a name, which characters can be used, and, in some systems, how long the file name suffix can be.

A file system also includes a format for specifying the path to a file through the structure of directories. This path is used to reference the file when needed either in system script (e.g., shell or bat) or directly in a program code or as OLE links to include a document in another. The path may be an absolute path or a relative path: An absolute path is a path that points to the same location on one file system regardless of the working directory or combined paths. It is usually written in reference to a root directory. A relative path is a path relative to the working directory of the user or application, so the full absolute path may not need to be given.

Storing a reference to a file or directory by using its path and file name is not reliable, as the path may be lost when a user renames or moves files or directories. Renaming or moving files or directories are nevertheless desired and required operations. If a user renames a file, the links to the file are broken. If a user renames a directory, the links to the file are broken as well as all files and subdirectories in the directory tree.

When a file then is moved to another place, all explicit and implicit references to the file become invalid, such as every program using the file or every document that refers to the file.

Some solutions exist to allow file move while maintaining available existing references. A first approach is to use an alias as illustrated below for different operating systems:
  a) Use system variables to identify a root directory:
    SET X=C:\Myfile\Data\Other\Nonsense
    and then use edit % X %\stuff.dat
    instead of edit C:\Myfile\Data\Other\Nonsense\stuff.dat
  b) DOS command SUBST that defines an alias as a disk:
    SUBST M: C:\Myfile\Data\Other\Nonsense
    and then use edit M:stuff.dat
    instead of edit C:\Myfile\Data\Other\Nonsense\stuff.dat
  c) Linux command 'ln':
    ln MyData/Myfile/Data/Other/Nonsense
    and then use edit MyData/stuff.dat
    instead of edit/Myfile/Data/Other/Nonsense/stuff.dat
  d) System path: use class path or command path.

The alias approach requires updating the alias when the file is moved to another place and thus requires the user to initially create the alias before the very first file use.

The NTFS file system for Windows provides a distributed link tracking service which automatically tracks links as they are moved. The link tracking service maintains its link to an object by using an object identifier (ID) uniquely identifying a file or directory on a volume. An index of all object IDs is stored on the volume. This service is available for shortcuts only and furthermore requires the operating system to explicitly subscribe to the service before using it.

U.S. Pat. No. 6,351,741 discloses a method of locating a file linked to a document in a relocated document directory structure. The method allows retrieving a reference to a linked file linked to a document. The reference specifies an absolute pathname. The mechanism parses the absolute pathname into a plurality of relative pathnames and appends a first one of the relative pathnames to a current directory specification for the document to produce a new absolute pathname. Subsequent ones of the plurality of relative pathnames are appended to the current directory specification until the new absolute pathname points to the linked file. While this system allows retrieval of a file in a structure that has been moved or duplicated, the solution is based on a search algorithm that runs several searches before succeeding. Moreover this solution concerns only files that are inside a sub-directory that have been moved or duplicated.

Accordingly, there is a need for a global solution of file move tracking that operates on a complete host file system and that does not require running successive operations to reach a moved file.

SUMMARY OF THE INVENTION

The present invention relates to a file management method and system and more particularly to a file move tracking method and system.

A first aspect of the invention provides a computer implemented method for managing file access. The method comprises: detecting a file move request for moving a file from a file source location to a file target location; creating a file move link for the file associating the file source location to the file target location; and storing the file move link in a file move link storage structure of the computer file system for a subsequent file access request.

According to a second aspect of the present invention, there is provided an apparatus for carrying out the method according to the first aspect of the invention.

According to a third aspect of the present invention, there is provided a computer program comprising instructions for carrying out the method according to the first aspect of the invention when the computer program is executed on a computer.

According to a fourth aspect of the present invention, there is provided a computer readable medium having encoded thereon a computer program according to the third aspect of the invention.

Further advantages of the present invention will become clear to the skilled person upon examination of the drawings and detailed description. It is intended that any additional advantages be incorporated therein.

BRIEF DESCRIPTION OF THE DRAWINGS

Embodiments of the present invention will now be described by way of example with reference to the accompanying drawings in which like references denote similar elements.

DETAILED DESCRIPTION OF THE INVENTION

Figure 1:
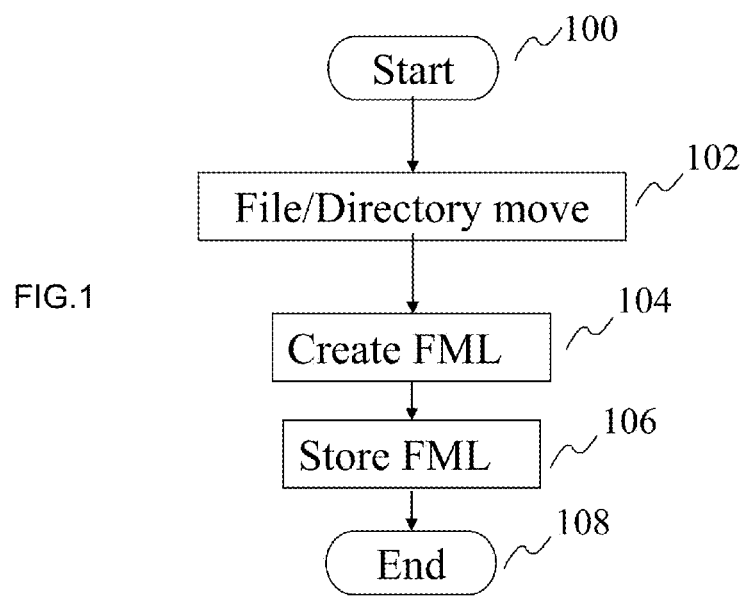
FIG. 1 is a flow chart of an illustrative process used for creating a file move link in accordance with an embodiment of the present invention.

With reference to FIG. 1, a flow chart of a process 100 used for creating a file move link is depicted in accordance with an embodiment of the present invention. The process begins by automatically detecting a file move operation (102). The file move operation requests to move a file from a source location to a target location. Next, a file move link (FML) is created between the source file location and the target file location (104). The file move link is stored (106) in a file move link storage structure of a file management system, and the process ends (108). In one embodiment, the file move link is stored in a relational database. However, a person skilled in the art would easily devise any other variant of implementation for such a storage structure, such as, for example, having a dedicated local table at each level of the file directory, each dedicated local table storing the file move links related to the files located within the respective directory.

While process 100 is described for a file move operation, the process applies similarly when a directory move operation is detected as well. When a directory move operation is detected, a file move link is created between the directory source location and the directory target location.

It is to be appreciated that a file move operation may also consider a cut and paste operation of files as well as a file renaming operation.

The present invention provides a method, system and computer program that operates at the operating system level within the file management system for allowing a user to access transparently any file even if the file has moved one or several times from an initial source location to target location. The present invention allows keeping traceability of file move operations inside the file management system.

Figure 2:
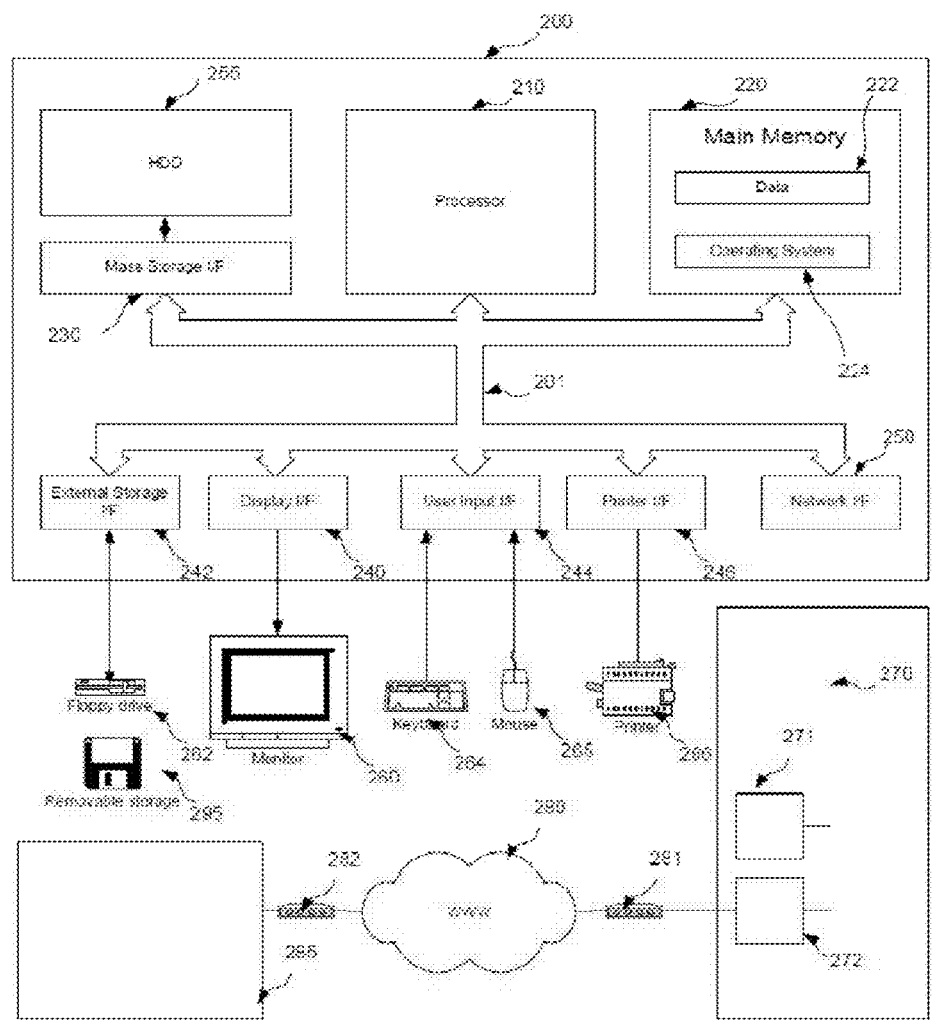
FIG. 2 depicts an illustrative computer system suitable for running embodiments of the present invention.

FIG. 2 shows a computer system 200 for supporting the file move tracking method of the present invention. The computer system 200 comprises a processor 210, a main memory 220, a mass storage interface 230, a display interface 240, and a network interface 250. These system components are interconnected through the use of a system bus 201. Mass storage interface 230 is used to connect mass storage devices (e.g., hard disk drive (HDD) 255) to computer system 200. One specific type of removable storage interface drive 262 is a floppy disk drive which may store data to and read data from a floppy disk 295, but may other types of computer readable storage medium may be envisaged, such as readable and optionally writable CD ROM drives. There is similarly provided a user input interface 244 which receives user interactions from interface devices such as a mouse 265 and a keyboard 264. There is still further provided a printer interface 246 which may send and optionally receive signals to and from a printer 266. Main memory 220 in accordance with embodiments contains data 222 and an operating system 224. While not represented in FIG. 2, a file system is part of the main memory 220. It is noted that the invention operates at the operating system level within the file system.

Computer system 200 utilizes well known virtual addressing mechanisms that allow the programs of computer system 200 to behave as if they only have access to a large, single storage entity instead of access to multiple, smaller storage entities such as main memory 202 and HDD 255. Therefore, while data 222 and operating system 224 are shown to reside in main memory 220, those skilled in the art will recognize that these items are not necessarily all completely contained in main memory 220 at the same time. It should also be noted that the term "memory" is used herein to generically refer to the entire virtual memory of computer system 200.

Data 222 represents any data that serves as input to or output from any program in computer system 200. Operating system 224 is a multitasking operating system known in the industry as OS/400; however, those skilled in the art will appreciate that the spirit and scope of the present invention is not limited to any one operating system.

Processor 210 may be constructed from one or more microprocessors and/or integrated circuits. Processor 210 executes program instructions stored in main memory 220 by operating on input data and generating output. Main memory 220 stores programs and data that processor 210 may access. When computer system 200 starts up, processor 210 initially executes the program instructions that make up operating system 224. Operating system 224 is a sophisticated program that manages the resources of computer system 200. Some of these resources are processor 210, main memory 220, mass storage interface 230, display interface 240, network interface 250, and system bus 201.

Although computer system 200 is shown to contain only a single processor and a single system bus, those skilled in the art will appreciate that the present invention may be practiced using a computer system that has multiple processors and/or multiple buses. In addition, the interfaces that are used in embodiments each include separate, fully programmed microprocessors that are used to off-load compute-intensive processing from processor 210. However, those skilled in the art will appreciate that the present invention applies equally to computer systems that simply use I/O adapters to perform similar functions.

Display interface 240 is used to directly connect one or more displays 260 to computer system 200. The displays 260, which may be non-intelligent (i.e., dumb) terminals or fully programmable workstations, are used to allow system administrators and users to communicate with computer system 200. Note, however, that while display interface 240 is provided to support communication with one or more displays 260, computer system 200 does not necessarily require a display 260, because all needed interaction with users and other processes may occur via network interface 250.

Network interface 250 is used to connect other computer systems and/or workstations to computer system 200 across a network 270. The present invention applies equally no matter how computer system 200 may be connected to other computer systems and/or workstations, regardless of whether the network 270 connection is made using present-day analogue and/or digital techniques or via some networking mechanism of the future. In addition, many different network protocols can be used to implement a network. These protocols are specialized computer programs that allow computers to communicate across network 270. TCP/IP (Transmission Control Protocol/Internet Protocol) is an example of a suitable network protocol, for example over an Ethernet network. As shown, the network 270 connects the system 200 to two further devices 271 and 272, which may be other computer systems similar to that described above, or other network capable devices such as printers, routers etc. In the present example, network device 272 is a lcl server, which is connected via a modem 281 to a public network 280 such as the word wide web. By means of this public network 280 a connection to a remote device or system 285 may be established.

Figure 3:
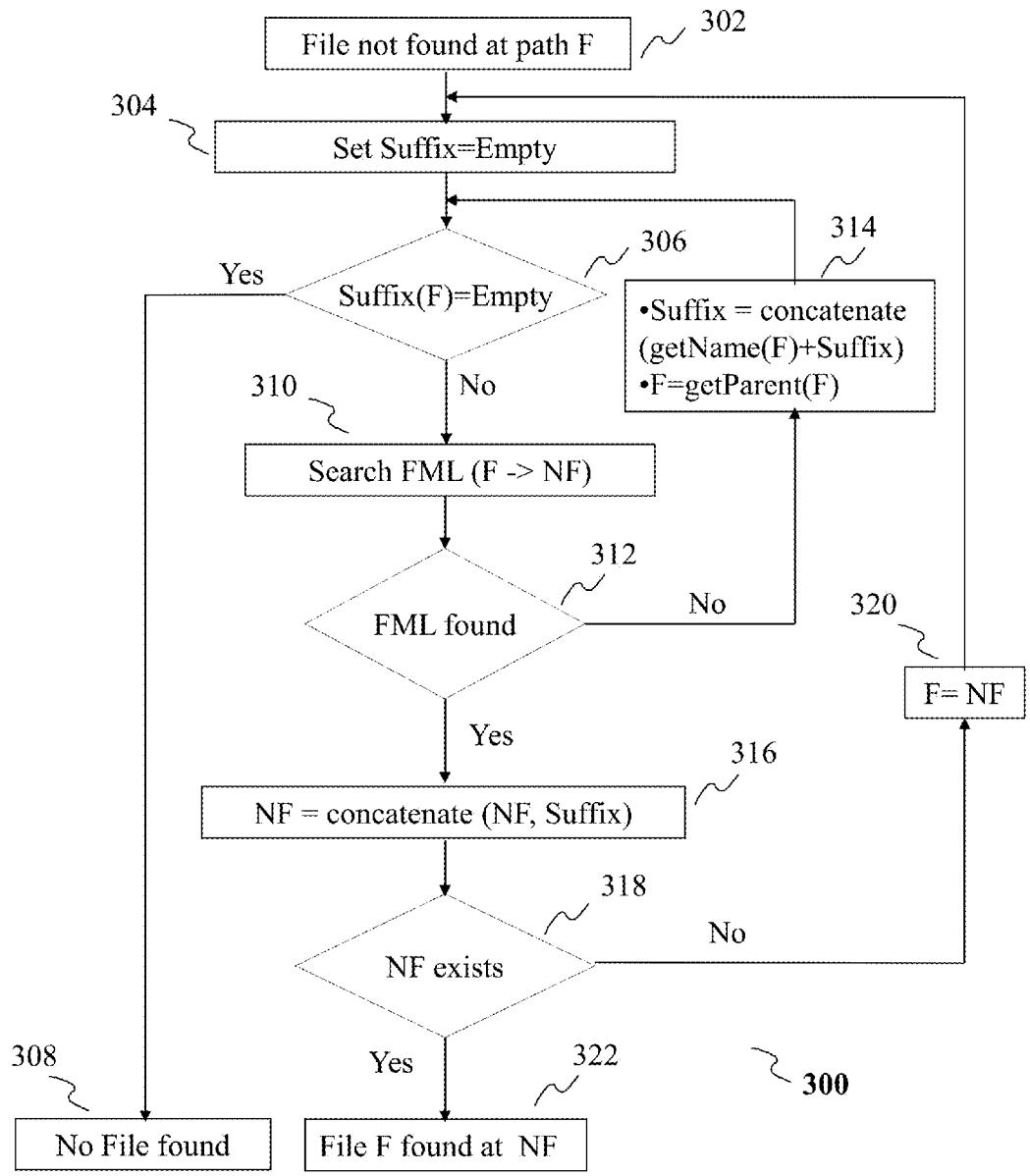
FIG. 3 is a flow chart of an illustrative process used for a file access in accordance with an embodiment of the present invention.

FIG. 3 shows a process 300 used for processing file access in accordance with an embodiment of the present invention. Process 300 begins when a "file not found" exception is detected by the file system (302). File access here may be interpreted as any operation intended to reach a file such as an edit, a move or a copy operation.

When a file is not reachable at the requested file path (302), the process enters a loop routine to search for the new file location of the file, if any. A test variable (Suffix) is initialized and set to an 'empty' value (304). A test is then performed to check if the file path of the requested file path is empty or not (306). If the file path for the requested file is found to be empty (branch Yes, 306), meaning that no file exist at the requested path, the loops ends (308).

If the file path is found not to be empty (branch No, 306), the process enters a search operation of file move links (FML) in the file move link table(s) (310). A test is then performed to check if a file move link associated with the requested file path is found or not (312).

If a file move link is found (branch Yes, 312), the process continues (316), as described further below.

If no file move link is found (branch No, 312), a new path is computed and the test variable (Suffix) is set to a new value (314). The new path is defined as the parent path:
 F=getParent(F)
and the value of the test variable is set as:
 Suffix=concatenate(getName(F)+Suffix).
Next, the process loops back, repeating (306) to (314) until a file move link is found (branch Yes, 312).

When a file move link is found (branch Yes, 312), the process continues and the new path is defined (316) as:
 NF=concatenate(NF, Suffix)
A test is then performed to check if the new path previously defined exists (318).

If the new path does not exists (branch No, 318), the new path is defined for the requested file (320), and the process loops back to (304).

If the new path exists (branch Yes, 318), the requested file is provided (322).

Figure 4:
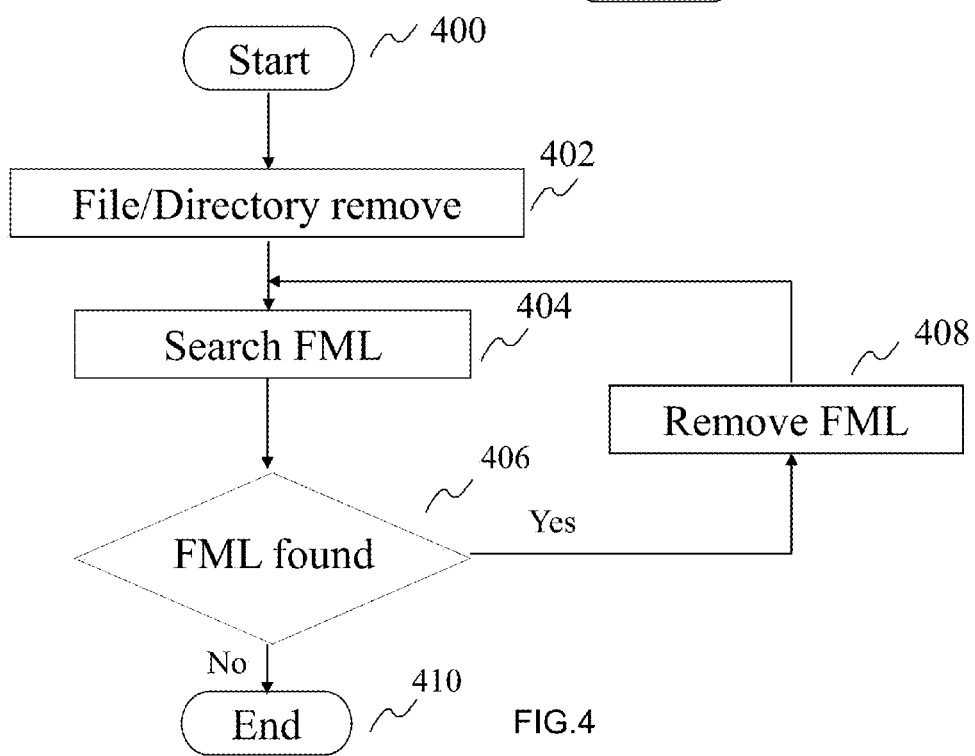
FIG. 4 is a flow chart of an illustrative process used for a file or a directory removal in accordance with an embodiment of the present invention.

With reference to FIG. 4, a flow chart of a process 400 used for file or directory removal is depicted in accordance with an embodiment of the present invention. The process begins by detecting a file removal operation (402) initiated by a client application. Next, a search is performed within the file move link storage structure (404) to search for existing links related to the file to be removed. If no file move link is found, the process ends (410). Otherwise, for each file move link found, the link is deleted and the process enters a loop to search and delete the chain of links.

While process 400 is described for a file removal operation, the process applies similarly for a directory removal operation.

Figure 5A:
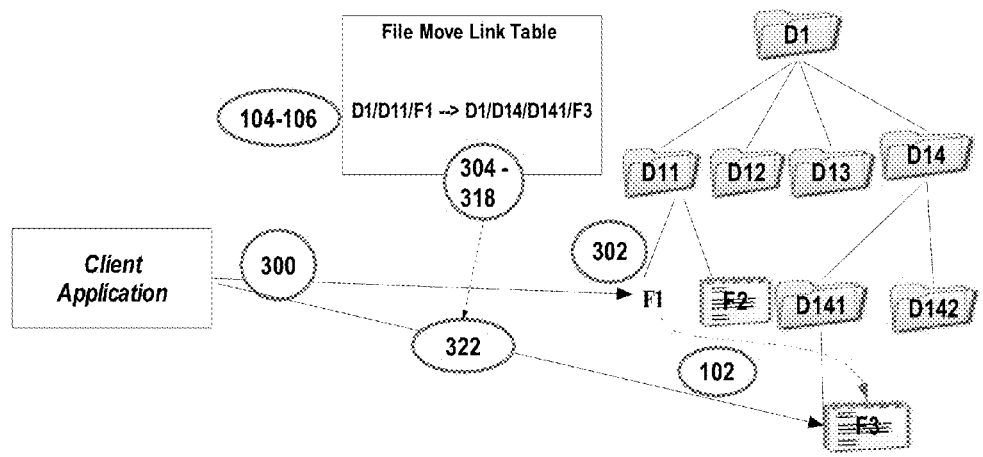
FIGS. 5a and 5b depict an illustrative directory and a file move link structure in accordance with an embodiment of the present invention.
Figure 5B:
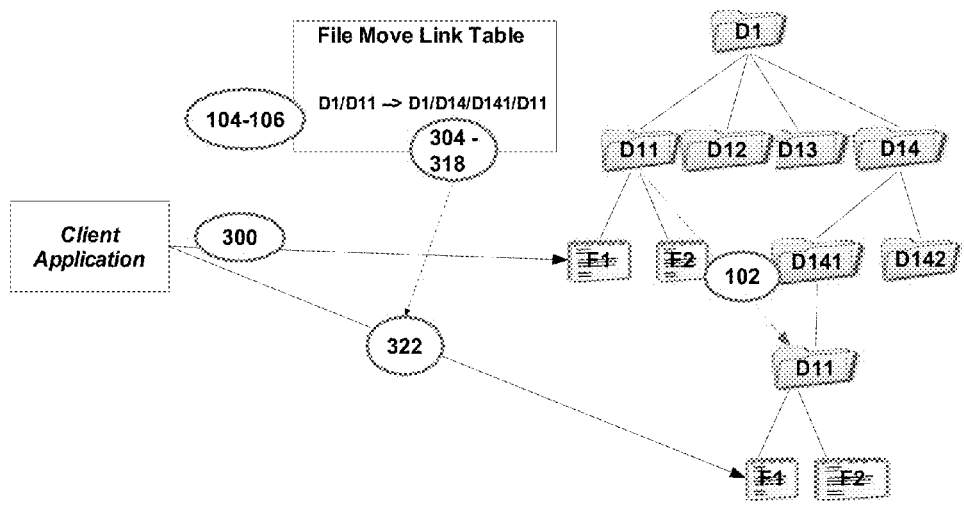

FIGS. 5*a* and 5*b* illustrate schematically directories and file move link tables in accordance with embodiments of the present invention.

FIG. 5*a* exemplifies a file access when the file has been moved. Numeral references used in FIG. 5*a* are identical to references used in FIG. 1 and FIG. 3. At 102, the file located at source location D1/D11/F1 is moved to target location D1/D14/D141/F3. At 104 and 106, a file move link is created, namely [D1/D11/F1->D1/D14/D141/F3] link and stored in the file move link storage structure. On a further attempt to access the file F1 at its old location D1/D11/F1 at 300, the file management system does not locate the file at 302, and a search is performed within the file move link storage structure to identify the new location (304 to 318). The file is accessed at its new location D1/D14/D141/F3 transparently for the requesting application at 322.

An advantage of the present invention is that the original file path is kept as is to identify the file. This allows keeping standard ways to reference a file, and moreover to deploy the present method for files that are already referenced on a computer system before it is implemented.

FIG. 5*b* exemplifies a file access when a complete directory has been moved. Numeral references used in FIG. 5*b* are identical to references used for steps of FIG. 1 and FIG. 3. At 102, directory located at D1/D11 is moved to target directory location D1/D14/D141/D11. At 104 and 106, a file move link is created, namely [D1/D11->D1/D14/D141/D11] link and stored in the file move link storage structure. It is important to note that only one file move link is stored for the root of the directory.

On a further attempt to access a file contained in source directory location (300), D1/D11/F1 for example, the file management system generates an access failure. A search is then performed within the file move link storage structure.

As the path D1/D11/F1 is not found in the table, a search on file ancestors D1/D11 is started (314). The new location is found (root directory D1/D11) and the file move link previously created and stored allows providing access to the file at its new location D1/D14/D141/D11/F1.

It is important to note here that the process for identifying the new location of a file is performed in two steps by searching in the file ancestry the first directory associated with a file move link, and then by substituting the new directory path for the old one in the file path.

Finally, it is to be appreciated that the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

To summarize one of the advantages of the present invention, is to offer a simple and efficient solution to avoid broken links (script or application failure) when files or directories have been moved.

The invention claimed is:

1. A computer implemented method for managing directory access, the method comprising:
   detecting a directory move request for moving a directory, wherein the directory is identified by a directory name and a directory source location, from the directory source location to a directory target location;
   creating a file move link for the directory associating the directory source location with the directory target location;
   storing the file move link within a file move link storage structure of the computer file system for a subsequent directory access request;
   detecting a directory access request searching for a file move link associated with the directory and the directory source location;
   retrieving the directory target location associated with the file move link if a file move link is found; and
   providing access to the directory at the directory target location; and
   after the searching:
   defining a new directory path for the directory if a file move link is not found, the new path defined by concatenating a parent directory path of the directory; and
   repeating the searching for the new directory path.

2. The method of claim 1, wherein the file move link creates an association between a directory pathname of the source location and a directory pathname of the target location.

3. The method of claim 1, wherein the file move link is stored within a table of the computer file system as a pointer between a directory source pathname and a directory target pathname.

4. The method of claim 1, wherein the directory move request or the directory access request is received from a client application running on the computer.

5. The method of claim 1, wherein the directory move request is a request for renaming a directory.

6. An apparatus for managing directory access, comprising:
   at least one computer device for performing the following:
   detecting a directory move request for moving a directory, wherein the directory is identified by a directory name and a directory source location, from the directory source location to a directory target location;
   creating a file move link for the directory associating the directory source location with the directory target location;
   storing the file move link within a file move link storage structure of the computer file system for a subsequent directory access request;
   detecting a directory access request searching for a file move link associated with the directory and the directory source location;
   retrieving the directory target location associated with the file move link if a file move link is found; and
   providing access to the directory at the directory target location; and
   after the searching:
   defining a new directory path for the directory if a file move link is not found, the new path defined by concatenating a parent directory path of the directory; and
   repeating the searching for the new directory path.

7. The apparatus of claim 6, wherein the file move link creates an association between a directory pathname of the source location and a directory pathname of the target location.

8. The apparatus of claim 6, wherein the file move link is stored within a table of the computer file system as a pointer between a directory source pathname and a directory target pathname.

9. The apparatus of claim 6, wherein the directory move request or the directory access request is received from a client application running on the computer.

10. The apparatus of claim 6, wherein the directory move request is a request for renaming a directory.

11. A non-transitory computer readable storage medium, which when executed by a computer device, performs a method for managing directory access, the method comprising:

detecting a directory move request for moving a directory, wherein the directory is identified by a directory name and a directory source location, from the directory source location to a directory target location;

creating a file move link for the directory associating the directory source location with the directory target location;

storing the file move link within a file move link storage structure of the computer file system for a subsequent directory access request;

detecting a directory access request searching for a file move link associated with the directory and the directory source location;

retrieving the directory target location associated with the file move link if a file move link is found; and providing access to the directory at the directory target location; and after the searching:

defining a new directory path for the directory if a file move link is not found, the new path defined by concatenating a parent directory path of the directory; and repeating the searching for the new directory path.

12. The non-transitory computer readable medium of claim 11, wherein the file move link creates an association between a directory pathname of the source location and a directory pathname of the target location.

13. The non-transitory computer readable medium of claim 11, wherein the file move link is stored within a table of the computer file system as a pointer between a directory source pathname and a directory target pathname.

14. The non-transitory computer readable medium of claim 11, wherein the directory move request or the directory access request is received from a client application running on the computer.

15. The non-transitory computer readable medium of claim 11, wherein the directory move request is a request for renaming a directory.

* * * * *